United States Patent [19]

Seifried

[11] Patent Number: 4,866,737
[45] Date of Patent: Sep. 12, 1989

[54] HIGH SPEED VOICEBAND DATA TRANSMISSION AND RECEPTION

[76] Inventor: Bruce Seifried, 164 Obert Dr., San Jose, Calif. 95136

[21] Appl. No.: 76,027

[22] Filed: Jul. 21, 1987

[51] Int. Cl.$^4$ .............................................. H03K 7/08
[52] U.S. Cl. ..................................... 375/22; 332/106; 340/825.63
[58] Field of Search ................ 375/22, 8, 100, 94, 375/68; 332/9 R; 371/69, 32, 33; 455/108, 127; 330/207 A, 251, 10; 370/9; 340/825.63, 353; 328/58

[56] References Cited

U.S. PATENT DOCUMENTS

| | | | |
|---|---|---|---|
| 3,528,011 | 9/1970 | Anderson | 375/22 |
| 3,783,412 | 1/1974 | Libby | 332/9 R |
| 4,051,539 | 9/1977 | Geddes et al. | 370/9 |
| 4,128,809 | 12/1978 | Kage | 375/100 |
| 4,207,524 | 6/1980 | Purchase | 375/22 |
| 4,608,630 | 8/1986 | Schott | 375/22 |
| 4,723,308 | 2/1988 | Kobayashi et al. | 455/108 |

Primary Examiner—Robert L. Griffin
Assistant Examiner—Marianne Huseman
Attorney, Agent, or Firm—Majestic, Parsons, Siebert & Hsue

[57] ABSTRACT

ASCII characters are coded in the form of 8, 16 or longer digital words. Signal pulses with durations proportional to such digital words are generated and filtered so that the filtered signal has substantially the same duration as the unfiltered signal. The filtered signal fits within the voiceband so that it can be transmitted through a voiceband medium such as a telephone network. At the receiver, zero-crossings of the received signal are detected and from the duration between consecutive zero-crossings, the particular ASCII represented by the duration of such signal may be recovered.

14 Claims, 7 Drawing Sheets

HIGH SPEED VOICEBAND DATA TRANSMISSION AND RECEPTION

BACKGROUND OF THE INVENTION

This invention relates in general to data transmission and reception, and in particular to high speed voiceband data transmission and reception systems.

A modem, an acronym for modulator/demodulator, is a device that allows the transfer of data across a medium. This medium may comprise satellite links, microwave transmission systems or telephone circuits for the voiceband. The data transferred is from an information store such as a computer, which communicates to another information store through the modem link.

Conventional modems for transferring data over standard telephone voice grade lines operate at various rates from 300 baud to 4800 baud. The telephone voice grade lines allow a bandwidth of 350 Hz to 3500 Hz. The most common data transfer techniques for modems operating in the voiceband are frequency shift keying, phase shift keying and quadurature amplitude modulation. Frequency shift keying is the process of representing a computer data bit as a logical "1" at a specific frequency and a logical "0" at another frequency. As the data ("1" or "0") is transferred to the modem for transmission, the representative frequency is varied correspondingly. In phase shift keying, the two logical states "1", "0" are represented by two different phases of the signal. With frequency shift keying and phase shift keying, the data transfer rates can be as high as 4800 baud with low bit error rates (normally about one error in every million bits transferred).

In frequency shift keying, one bit is transferred at a time. In phase shift keying, one or two bits may be transferred at a time. In quadurature amplitude modulation, four bits may be transferred at a time; this allows the data rate to be increased up to 9600 baud. Quadurature amplitude modulation employs a combination of amplitude modulation and phase shift modulation to transfer four bits at a time. To further reduce telephone costs, it is desirable to further increase the data rates. It is therefore desirable to provide data transmission and reception systems which transfer data at rates higher than the systems described above.

SUMMARY OF THE INVENTION

This invention is directed towards apparatuses for transmitting and receiving information through a medium which has a bandwidth substantially the same as the voiceband. The apparatus for transmitting information comprises means for generating a coding signal pulse whose duration is a function of the information to be transmitted. The transmitting apparatus further comprises filter means for filtering the coding signal pulse so that the duration of the filtered signal is substantially the same as that of the unfiltered signal pulse. The apparatus also comprises means for transmitting the filtered signal through the medium. In the preferred embodiment the generating means includes a counter means and means for storing a set of numbers, each number representing information for transmission. The means for storing also loads the counter means with a number stored representing the information to be transmitted. The counter means is such that when it counts to a certain number, it generates a count complete signal to so indicate. In the preferred embodiment the generating means further comprises means responsive to the count complete signal for generating the coding signal as a square signal pulse by switching between a high and a low voltage level.

Thus, the invention is based on the observation that, instead of coding the data as a frequency, phase, or a combination of amplitude and phase modulation, the duration of a signal pulse may be used for coding the two logical states Such coding scheme permits more bits to be transferred at a time than the systems described above. Thus, in the preferred embodiment, eight bits are transferred at a time, which allows data transfer of varying rates from no less than 15.2 kilobaud up to 26.6 kilobaud Furthermore, in the preferred embodiment, the duration of the signal is controlled digitally so that the coding and decoding of information at the transmitting and receiving ends can be performed accurately to recover the exact information being transmitted.

Another aspect of the invention is directed towards an apparatus for receiving information through a medium which has a bandwidth substantially the same as the voiceband, where the information has been encoded in the form of a signal whose duration is a function of the information. The receiving apparatus comprises means for detecting two consecutive instances when the amplitude of the signal received crosses a predetermined threshold level and means for determining the information from the time duration between the two instances. In the preferred embodiment the detecting means is a zero crossing detector; the information has been encoded according to a look up table containing a set of numbers each corresponding to a time duration which represents information for transmission to the apparatus, and the determining means stores therein the table for determining the information from the time duration.

DETAILED DESCRIPTION OF THE INVENTION

The invention is based on the observation that information to be transmitted is first coded as the duration of a signal pulse with frequencies in the voiceband. The signal is transmitted and at the receiving end, the information is recovered by decoding in accordance with the duration of the pulse received. Thus, all the characters in an extended ASCII character set (e.g., the English alphabet A–Z, the numbers 0–9, all standard English punctuation, and several control characters) may each be represented by a conventional set of eight-bit words consisting of ordered 1's and 0's called bytes. For example, the ASCII byte for the letter "A" may be (01000001).

Each of the 256 eight-bit words can be represented by a signal pulse whose duration is proportional to the magnitude of the word. Thus, if a table listing the ASCII characters and the corresponding eight-bit words is stored in the transmitter and the receiver, an ASCII character may be coded into the corresponding eight-bit word and then into a signal pulse having a duration proportional to such word. The signal pulse may then be processed in a manner that retains information concerning its duration and the processed signal transmitted to the receiver. At the receiver, the duration of the received signal is measured and the corresponding eight-bit word and hence the represented ASCII character can be recovered according to the table.

In the preferred embodiment, eight-bit code words are used to represent the ASCII characters. It will be understood, however, that longer words such as 16, 32, 64 etc bit words may also be used instead and are within the scope of this invention.

Where the information to be transmitted is already in the form of a digital word (e.g. an eight-bit computer word), the above described process can be simplified. By selecting an appropriate time unit (e.g. microsecond), a computer word can be translated directly into a duration of a signal pulse equal to the word multiplied by the time unit selected. If both the transmitter and receiver are cognizant of such time unit, a computer word can be translated into the duration of a pulse in the transmitter and recovered by the receiver accurately. Thus, instead of having to store a table in the transmitter and receiver for coding the information to be transferred, the duration of a signal pulse in the form of a word measured in a set time unit may be used in both the transmitter and receiver directly as a computer word. In the preferred embodiment, the same time unit is used in both the transmitter and receiver. If an eight-bit word is used to represent information, and one microsecond steps are used between each possible word, 256 discrete frequencies are required to represent each symbol.

Figure 1:
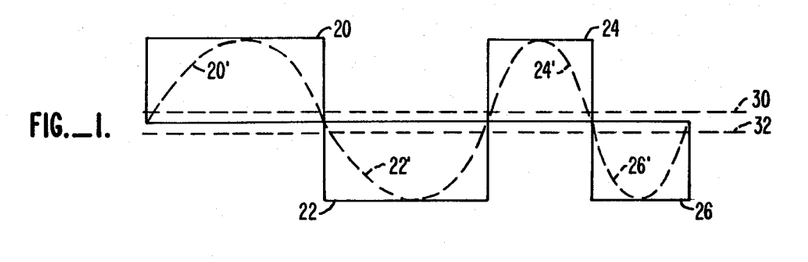
FIG. 1 is a graphical illustration of a coding signal pulse and of the, pulse after it is filtered to illustrate the preferred embodiment of the invention.

By using eight-bit code words, 256 symbols can be represented. Each of the 256 symbols correspond to a distinct frequency. FIG. 1 is a graphical illustration of a coding signal pulse and of a filtered coding signal pulse to illustrate the invention. Thus, the substantially square signal pulse 20 has a duration which corresponds to a particular ASCII character, and thus represents a character. In order for the signal pulse to pass through a telephone circuit within the voiceband, signal pulse 20 is filtered to obtain the filtered coding signal pulse 20' (shown in FIG. 1 in dotted lines) which has a frequency within the voiceband. Signal pulse 20' is then transmitted through a medium which has a bandwidth substantially the same as the voice band, such as a telephone line. A receiver at the receiving end receives pulse 20'. The receiver uses the same coding scheme as in the transmitter as described above where pulse 20 has been generated in accordance with the same scheme. At the receiver, the duration of pulse 20' is then measured and the ASCII character corresponding to such duration is then recovered.

From the above description, it is obvious that it is important for the durations of pulses 20, 20' to be essentiallythe same. If the duration of each of the pulses 20, 20' is defined as the duration between the zero crossings, then the duration of the two pulses 20, 20' are essentially the same. Thus, a zero-crossing detector may be used at the receiver for detecting the duration of pulse 20' wherein the duration so determined will be essentially the same as the duration of pulse 20 generated in the transmitter. In a conventional zero-crossing detector, however, the detector detects instances where signal amplitudes crosses a certain predetermined low threshold instead of the zero crossing points. Such low thresholds may, for example, be 30 for pulse 20' and 32 for pulse 22'. Provided that such threshold is low compared to the peak signal amplitudes of the pulses detected, the duration of pulse 20' detected will be essentially the same as pulse 20 generated in the transmitter.

As shown in FIG. 1, pulses 20, 20' are positive going pulses. An ASCII character can also be coded as a substantially square negative going pulse 22. After being filtered, pulse 22' is obtained. Substantially square pulse 24 has a shorter duration than pulse 20 and represents a different ASCII character than pulse 20. As shown in FIG. 1, a negative going pulse 26 representing the same character as pulse 24 is sent as a redundancy check for discovering transmission errors.

Figure 2:
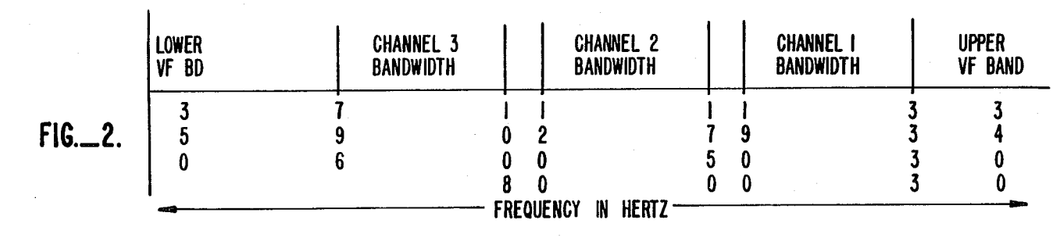
FIG. 2 is a schematic view of a voiceband divided into three channels to illustrate the invention.

From the above discussion, it will be evident that the number of possible characters that can be sent is limited only by the bandwidth of the voiceband. Since the voiceband contains more than 256 distinct frequencies, it may be desirable to divide the voiceband into different channels each capable of transferring eight bits of data at a time. This is, for example, illustrated in FIG. 2. As shown in FIG. 2, channel 1 has a bandwidth from 1900 Hz to 3333 Hz, channel 2 from 1200 to 1750 Hz and channel 3 from 796 to 1008 Hz.

Instead of dividing the voiceband into three channels as shown in FIG. 2 with each channel conveying eight bits at a time, it is also possible to divide the voiceband into a different number of channels each conveying a different number of bits than eight. Instead of transmitting eight bit words, 16, 24, 32 or longer bit words may be used to achieve higher data rate. Since eight bits normally represent a full computer word, this device has the capability to transfer an eight bit character each and every cycle of transmission. This amounts to sending no less than 1900 characters a second which would fill a normal 80 by 25 computer display screen once every second.

In the preferred embodiment, the duration of a coding signal pulse is generated by adding to the duration corresponding to an ASCII character, a pulse duration corresponding to a carrier frequency. This is particularly advantageous when the voiceband is divided into different channels, each channel employing a different carrier frequency. This simplifies the differentiation of signals in different channels at the receiving end by detecting their different carrier frequencies. Thus even though signal pulses present in the transmission may include pulses in different channels destined for different receivers, they can be separated easily by filters whose pass bands match the bandwidths of the channels.

The above described data coding technique is similar to pulse width modulation techniques applied in other contexts. Another aspect of the invention is the preciseness with which a pulse width can be modulated/demodulated with respect to its width component. The preciseness is achieved by generating the coding signal digitally. In conventional pulse width modulation techniques, pulses are generated by analog techniques which cannot achieve the accuracy achievable with the techniques of this invention.

Figure 3:
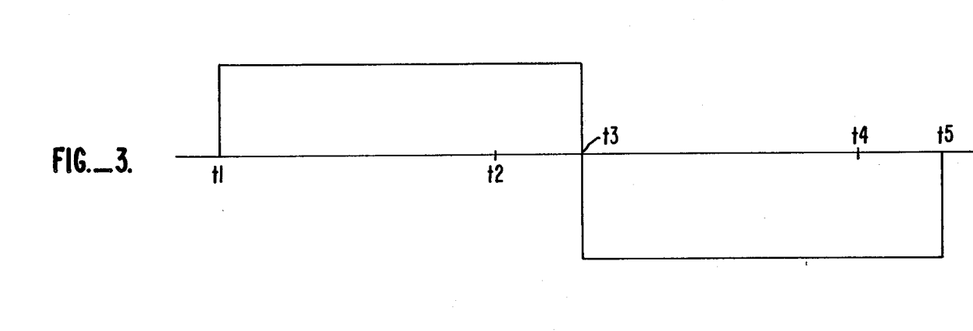
FIG. 3 is a schematic view of a coding signal pulse to illustrate how the pulse can be generated digitally by a transmitting apparatus.

FIG. 3 is a graphical illustration of a coding signal pulse to illustrate how the pulse can be generated digitally by a transmitting apparatus. At time t1, the output of the transmitter is set to a high voltage level and a counter for counting the duration of the carrier pulse is started. The counter is operated at a rate that sets the time unit for the transmitter. When the carrier counter counts to a number corresponding to the width of the carrier pulse at time t2, another counter for counting the eight-bit computer word is started. When the word counter counts to a number corresponding to the eight-bit computer word at time t3, the output voltage level of the transmitter is switched to low thereby generating a substantially square pulse having a duration equal to the sum of the durations of the carrier and computer word pulses. As described below, in the preferred embodiment, the same ASCII character is transmitted a second time in the form of a negative going pulse so that the above described process is repeated except that the voltage level of the output of the transmitter is switched to a negative voltage instead.

Figure 4:
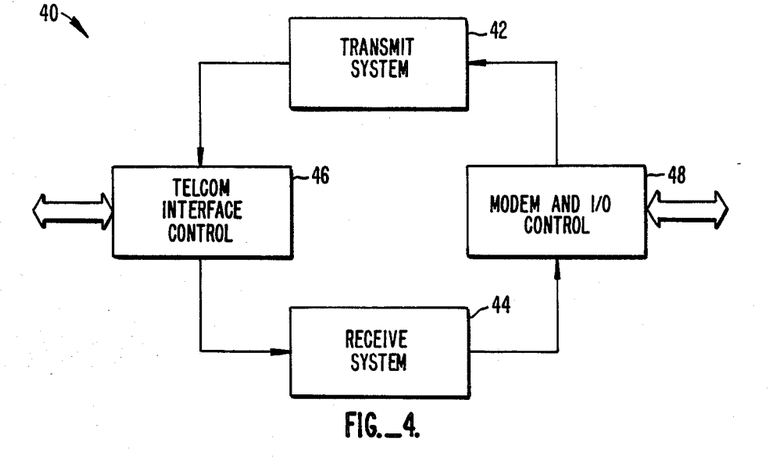
FIG. 4 is a block diagram of a modem system to illustrate the preferred embodiment of the invention.

FIG. 4 is a block diagram of a modem system to illustrate the preferred embodiment of the invention. As shown in FIG. 4, modem 40 comprises a transmit system 42, a receive system 44, a telephone communication interface control 46 and a modem and input/output control 48. The telephone communication interface control 46 provides the required signal amplification, signal filtering and serves as the interface to a standard two-wire twisted pair telephone line network. The modem and input/output control 48 controls all functions of the send and receive system logic including all necessary hand shaking between communication links. Control 48 also controls the input/output of data to the serial port of a computer.

Figure 5:
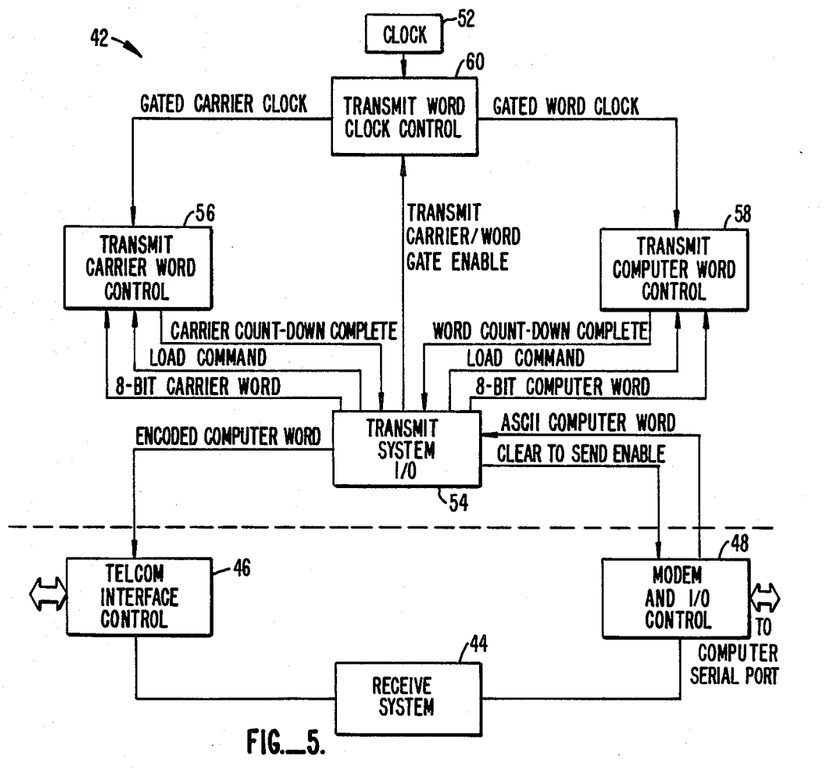
FIG. 5 is a block diagram of the modem of FIG. 4 illustrating in more detail the transmitting portion of the modem.

FIG. 5 is a block diagram of the modem of FIG. 4 illustrating in more detail the transmit system 42. Transmit system 42 comprises a clock 52, a transmit system input/output control 54, a transmit carrier word control 56, a transmit computer word control 58 and a transmit word clock control 60. Clock 52 supplies clock pulses for operating the transmit system; in one embodiment which has been found to be satisfactory, the clock 52 operates at one MHz. The transmit system input/output control controls the loading of the computer word to be transmitted and necessary commands for the generation of the coding signal pulse and the transfer of the encoded computer word for transmission through the telephone communication interface control 46. A carrier frequency is first selected through a carrier select switch at the transmit carrier word control 56; alternatively, the carrier frequency may be selected by programming the modem. The control 54 receives the ASCII computer word from the modem input/output control 48. Transmit computer word control 58 includes a down counter whose count is then set to the eight-bit computer word.

The carrier word control 56 contains a down counter whose count is set to the pulse duration corresponding to the carrier frequency selected or programmed. Clock control 60 supplies carrier and word clock pulses to controls 56 and 58 for operating the down counters therein. Thus, when the transmission path is clear, control 54 causes the down counter in the carrier word control 56 to count down to zero and subsequently causes the down counter in the computer word control 58 to count down to zero. At such instant, the transmit system control 54 switches the output level of the modem to generate a square pulse. Transmit system control 54 controls the down counters in controls 56, 58 by gate enable commands to clock 60.

Figure 6:
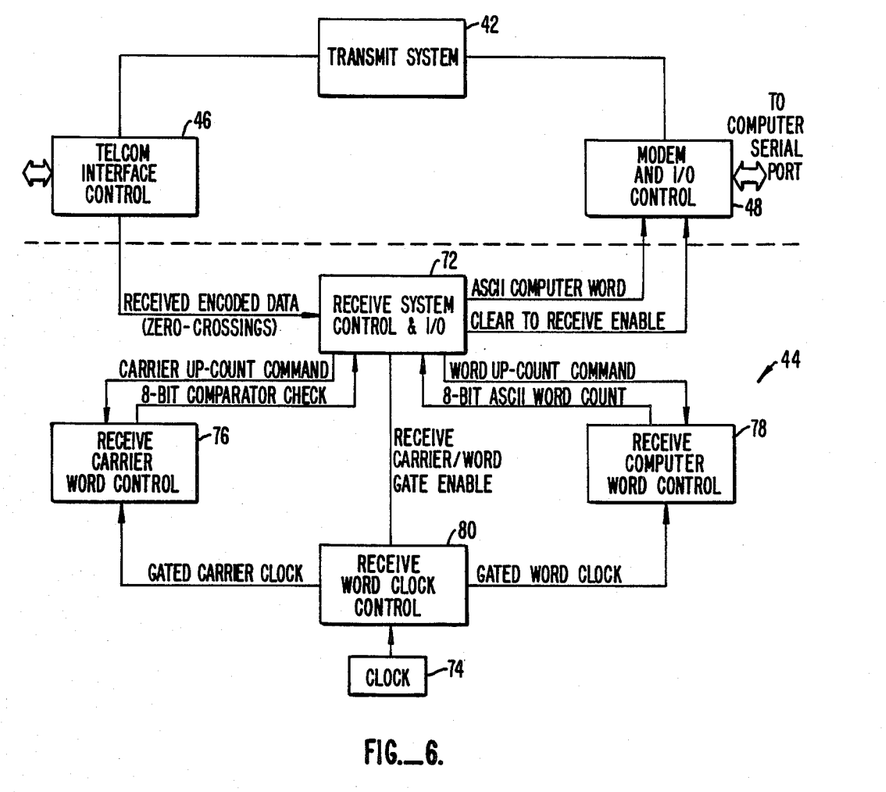
FIG. 6 is a block diagram of the modem of FIG. 4 illustrating in more detail the receiving portion of the modem.

FIG. 6 is a block diagram of the modem of FIG. 4 illustrating in more detail the receiving portion of the modem. As shown in FIG. 6, the receive system 44 comprises a receive system control 72, a clock 74, a receive carrier word control 76, a receive computer word control 78 and a receive word clock control 80. The receive system control controls the decoding of the computer word from the zero-crossings detected and generates the necessary commands to operate the other components of the receive system. The receive carrier word control 76 includes an up-counter pre-selected with the same 8-bit carrier word as in the down-counter in the transmit carrier word control. The receive computer word control 78 also contains an up-counter for generating the computer word as a function of the duration between zero-crossings determined by the receive system control 72. The receive word clock control 80 generates carrier and word clock pulses for operating the up counters in controls 76 and 78. Clock 80 operates at substantially the same 1 MHz rate as clock 60 in the transmit system.

Figure 7:
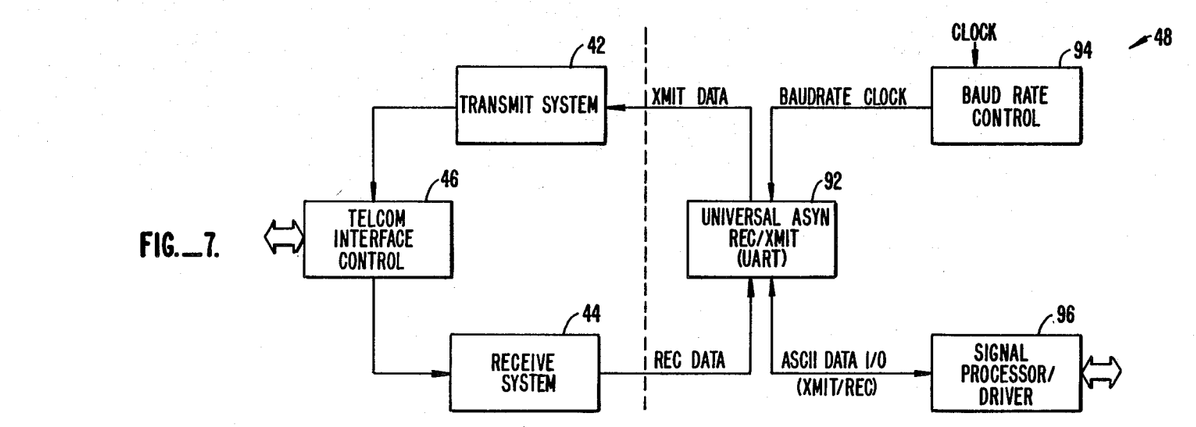
FIG. 7 is a block diagram of the modem of FIG. 4 illustrating in more detail the input/output control portion of the modem.

FIG. 7 is a block diagram of the modem of FIG. 4 illustrating in more detail the modem and I/0 control system 48. As shown in FIG. 7, control system 48 comprises a universal asynchronous receive/transmit unit (UART) 92, a baud rate control 94 and a signal processor/driver 96. The UART 92 performs necessary conversion of serial to parallel data to be transmitted and parallel to serial data for reception through the computer serial port interface (not shown in FIG. 7). The UART also controls the specific transmit and receive functions for transmitting a computer word received from the computer to the transmit system and for transferring the computer word received from the receive system 44 to the computer serial port. The baud rate control 94 controls the data rate at which the send and receive data is transferred between the modem and the computer which may between 300 baud up to 56 kbaud depending on the rate set by the computer and the communications link. The signal processor/driver 96 performs the signal conditioning for the data being received. In one embodiment which has been found to be satisfactory, the master clock for the modem UART operates at 1.8432 MHz.

Figure 8:
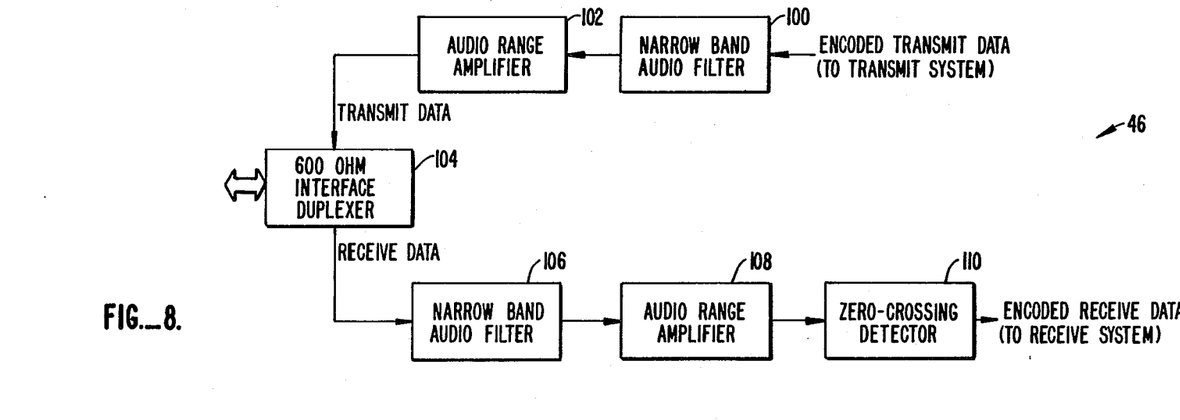
FIG. 8 is a block diagram of the modem of FIG. 4 illustrating in more detail the telephone communication interface control portion of the modem.

FIG. 8 is a block diagram of the modem of FIG. 4 illustrating in more detail the telephone communication interface control portion of the modem. As shown in FIG. 8, the interface control unit 46 includes a narrow band audio filter 100, an audio range amplifier 102, a 600

Ohm interface duplexer 104, a narrow band audio filter 106, an audio range amplifier 108 and a zero-crossing detector 110. Filter 100 filters the coding signal pulse from the transmit system 42 so that the duration of the filtered pulse is essentially the same as that of the coding pulse from the transmit system and so that the filter pulse has frequencies within the voiceband. The filtered pulse is amplified by amplifier 102 and coupled by duplexer 104 to a standard telephone network. The duplexer provides the necessary separation of the send and receive signals as performed in commonly used home and business telephone systems. The duplexer also provides the proper resistive termination to the telephone network. When the modem is receiving signals, the signals from the telephone network pass through duplexer 104 to the narrow band audio filter 106 whose characteristics are substantially identical to that of filter 100. The filtered signal is amplified by amplifier 108. The zero-crossings of the amplified signal are detected by detector 110.

Figure 9:
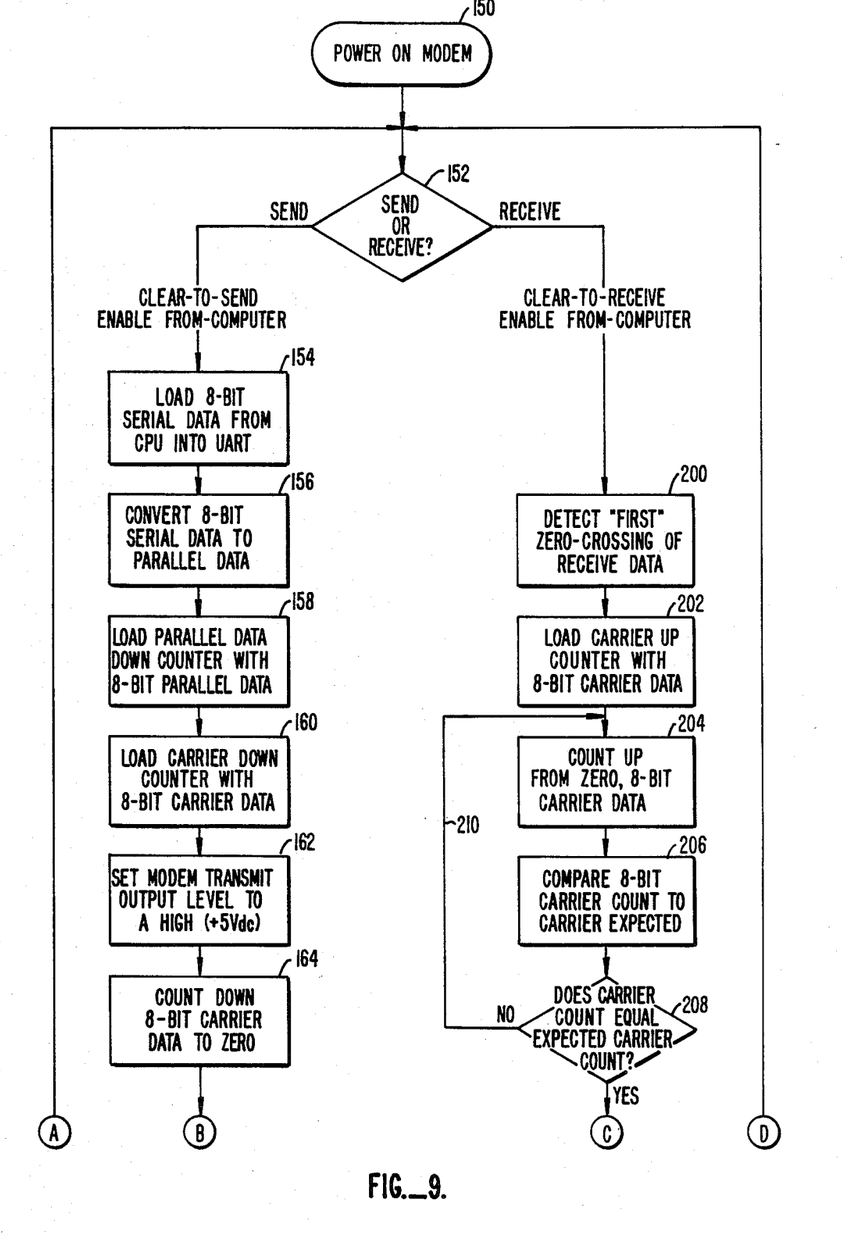
FIGS. 9, 10 and 11 together comprise a flow chart to illustrate the method of operation of the modem of FIG. 4.
Figure 10:
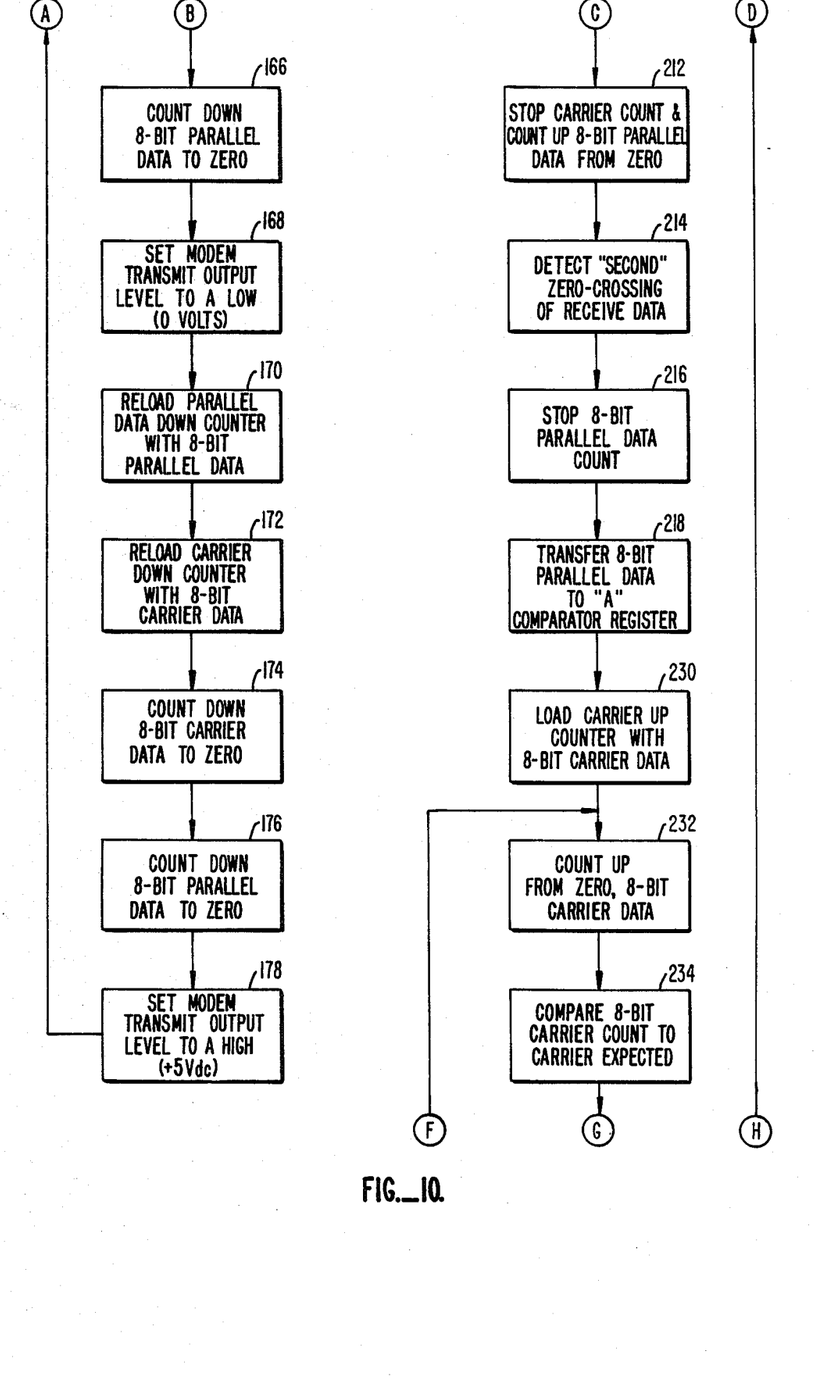
Figure 11:
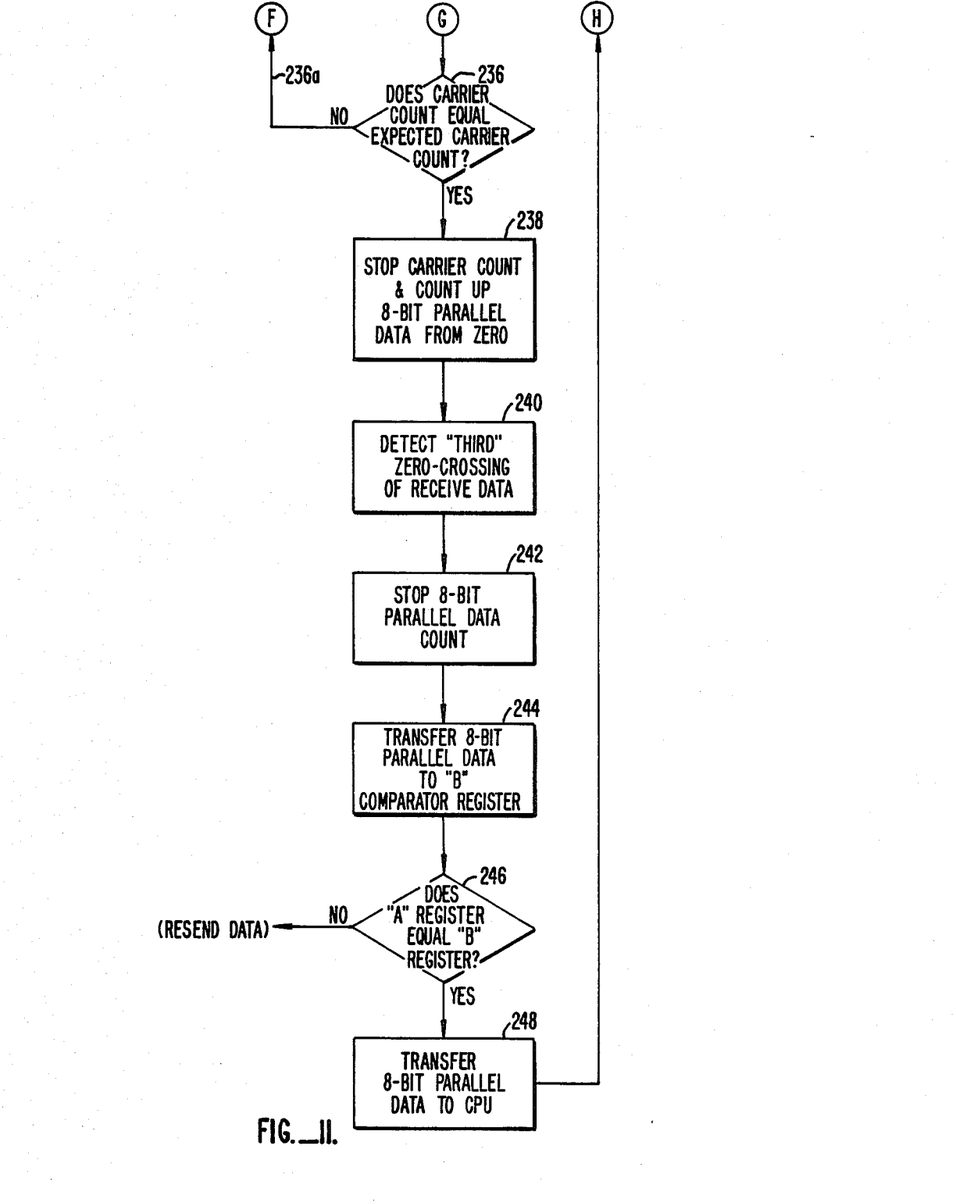

The operation of the modem will now be described in reference to FIGS. 4–11, where FIGS. 9–11 together comprise a flow chart illustrating the method of operation of the modem. After power to the modem is switched on (Block 150) decision is made as to whether data is to be transferred from the modem or received (Diamond 152). Assuming that data is to be transmitted and that the transmission channel is clear, the transmit system control 54 transmit a "clear to send" command to the modem and I/0 control 48. Control 48 then loads an eight-bit serial data from the computer into the UART 92 (Block 154). The UART converts the eight-bit serial data from the computer to parallel data (Block 156) and the parallel data is loaded by control 48 through control 54 to the down counter in transmit computer word control 58 (Block 158). The down counter in transmit carrier word control 56 is also loaded with an eight-bit carrier word set either through a carrier select switch or by programming during an initialization stage (Block 160). The modem transmit output level is set to a high level such as 5-volts (Block 162); this corresponds to the time t1 in FIG. 3.

Control 54 in the transmit system sends a carrier gate enable signal to the clock control 60. Clock control 60 in turn supplies carrier clock pulses to the down counter in transmit carrier word control 56 for operating the counter. When the down counter in control 56 counts to 0 (Block 164), control 56 sends a "carrier count-down complete" command to control 54 which then sends a carrier gate enable signal to the clock control 60. Clock control 60 then supplies word clock pulses to the down counter in transmit computer word control 58 for operating the counter. When the down counter in control 58 counts to 0 (Block 166), the modem transmit output level is then switched to a low level such as 0 volts (Block 168). This corresponds to the time t3 in FIG. 3.

To perform a redundancy check, the same eight-bit computer word is re-transmitted so that a redundancy check can be performed at the receiving end to ensure the accuracy of transmission. Thus, the down counters in the transmit carrier word control and transmit computer word controls 56, 58 are reloaded with the eight-bit carrier and computer data (Blocks 170, 172). The down counter in control 56 then again counts to 0 (Block 174) which corresponds to time t4 in FIG. 3. In essentially the same manner as that described above, the down counter in control 58 then counts to 0 (Block 176) and the modem transmit output level is then set to a high level e.g. 5 volts (Block 178). This corresponds the time t5 in FIG. 3. After the transmission of the computer word has been completed, the modem transmit output level is automatically set to a low level and the modem returns to check whether data is to be transmitted or received (Diamond 152).

If data is to be received by the modem, a "clear to receive" command is sent by the receive system control 72 to control 48. The receive signal passes through duplexer 104, filtered by filter 106, amplified by amplifier 108 and is detected by detector 110. The first zero-crossing of the receive data is detected (Block 200) and the up-counter in the receive carrier word control 76 is loaded with an eight-bit carrier word (Block 202). The up-counter counts up from 0 and the count of the counter is compared to the expected eight-bit carrier data (Blocks 204-206) when commanded by the "carrier up-count command" from the receive system control 72.

Control 76 includes an eight-bit comparator which compares the count of the up counter and the expected carrier count. If the two are not equal, the up counter simply continues to count; if the two are equal, command is transferred to the receive system control through a command "eight-bit comparator check". See Diamond 208 and loop 210. When the counter count is equal to the expected carrier count, the receive system control 72 then stops the up counter in the control 76 and sends a "word up-count command" to the receive computer word control 78 causing the up counter therein to stop counting and the up counter in receive computer word control to count up (Block 212). When the second zero-crossing of the received signal is detected by detector 110, the telephone communication interface control 46 sends a signal to receive system control 72 which stops the up counter in control 78 (Blocks 214, 216). The eight-bit parallel data in the up counter in control 78 is then transferred to a comparator register A in the receive system control 72 (Block 218).

If redundancy check is a feature employed by the modem receiving the data as well as the modem transmitting the data, Blocks 230-248 and the description below illustrate how the redundancy check is performed. When a redundancy check scheme is employed, the transmitting modem transmit the same information a second time in a form of a second pulse signal immediately following the first pulse signal where the two pulses should have the same duration. The receive system simply detects the presence of a third zero-crossing and computes the eight-bit computer word from the time duration between the second and third zero-crossings.

Thus, the up counter in receive carrier word control 76 is set to 0 and operated by the carrier clock from clock control 80 to count up (Block 232). The count of the up counter in control 76 is compared by comparator in the control 72 (Block 234) so that if the count does not equal the expected carrier count, the up counter continues to count; but if the count equals the expected carrier count, control is passed to the receive system control 72 as before (Diamond 236, loop 236a). The receive system control 72 causes the up counter in control 76 to stop and sends a "word up-count command" to the receive computer word control 78, causing the up counter therein to count up (Block 238). When detector 110 detects a third zero-crossing of the received data (Block 240), the receive system control 72 causes the up counter in control 78 to stop (Block 242) and the eight-bit parallel data in the up counter is then transferred to B comparator register in the receive system control 72

Included as part of the specification is a parts list attached hereto as Appendix A.

APPENDIX A

COMPONENT LISTING OF INTEGRATED CIRCUITS
TELCO INTERFACE CONTROL

| | |
|---|---|
| 600 OHM INTERFACE DULFEXER: | MC3419 Subscriber Loop Interface Circuit(SLIC) |
| AUDIO RANGE AMPLIFIER: | NE571 Audio Compander Amplifier |
| NARROW BAND AUDIO FILTER: | MC14533 Band-Pass Filter |
| ZERO-CROSSING DETECTOR: | LM2901 Voltage Comparator |

TRANSMIT SYSTEM

| | |
|---|---|
| TRANSMIT CARRIER WORD CONTROL: | 74LS191 4-bit Up/Down Counter |
| | 8-SPST Combination Carrier Select Switch |
| TRANSMIT COMPUTER WORD CONTROL: | 74LS191 4-bit Up/Down Counter |
| TRANSMIT WORD CLOCK CONTROL: | 1,0000 Mhz Crystal CLock Oscillator |
| | 74LS76 Dual JK Flip-Flop |
| | 74LS08 Quad 2-Input "AND" Gate |
| | 74LS393 Dual 4-bit Binary Counter |

RECEIVE SYSTEM

| | |
|---|---|
| RECEIVE SYSTEM CONTROL & I/O: | 74LS373 B-Bit Parallel I/O Port |
| RECEIVE CARRIER WORD CONTROL: | 74LS191 4-bit Up/Down Counter |
| | 8-SPST Combination Carrier Select Switch |
| RECEIVE COMPUTER WORD CONTROL: | 74LS191 4-bit Up/Down Counter |
| RECEIVE WORD CLOCK CONTROL: | 1.0000 Mhz Crystal CLock Oscillator |
| | 74LS04 Hex Inverter |
| | 74LS15 Triple 3-Input "AND" Gate |

MODEM & I/O CONTROL

| | |
|---|---|
| UNIVERAL ASYCHRONOUS I/O PORT: | TR1602 UART |
| BAUD RATE CONTROL: | 1.8432 Mhz Crystal Clock Oscillator |
| | NC14411 Baud Rate Generator |
| | 10 Position Baud Rate Selection Switch |
| SIGNAL PROCESSOR/DRIVER: | 74LS04 Hex Inverter |
| | MC1488 TTL to RS232 Converter/Driver |
| | MC1489 RS232 to TTL Converter/Driver |

NOTE: All components listed are as specified or equilavents are used.

(Block 244). The eight-bit parallel data in the A and B registers are then compared (Diamond 246). If the data in the two registers are equal, the eight-bit parallel data is then transferred by control 72 to modem and I/O 48 and to the computer serial port. If the readings of the two registers are not equal, the receive system control sends a single tone signal to the transmitting modem requesting that the data be resent.

In the redundancy check aspect of the invention described above, the transmit system control 54 contains a storage means such as a register for storing the computer word to be transmitted twice, so that the same computer word can be loaded twice into the down counter into the transmit computer word control 58. Similarly, the receive system control 72 contains two registers A and B for storing the eight-bit parallel data received consecutively for checking the accuracy of transmission. It will be understood, however, that the data to be retransmitted or compared may be stored in other parts of the transmit or receive systems; all such configurations are within the scope of the invention. Square signal pulses are used in the preferred embodiment since they are simple to generate with a given duration of the pulse; it will be understood that pulses of other shapes may also be used and are within the scope of this invention.

While the preferred embodiment has been described with the use of carrier frequencies, it will be understood that the invention can be implemented without the use of carriers and are still within the scope of the invention. Other terms and expressions which have been employed herein are used as terms of description and not of limitations, and there is no intention, in the use of such terms and expressions of excluding equivalents of the features shown and described, or portions thereof, it being recognized that various modifications are possible within the scope of the appended claims.

I claim:

1. An apparatus for receiving information through a medium which has a bandwidth substantially the same as the voiceband, said information having been encoded in the form of a signal whose duration is a function of the information, said apparatus comprising:

means for detecting two consecutive instances when the amplitude of the signal received crosses a predetermined threshold level;

means for determining the information from the time duration between the two instances;

wherein the information received by the apparatus is in the form of a digital word and originates from a source which includes a clock operated at a predetermined rate and wherein the signal pulse transmitted by the source is generated with a duration proportional to the digital word divided by the rate of the clock, and wherein the determining means converts the duration of the signal pulse received back into the digital word, said determining means including:

counter means operated at substantially the same rate as the clock of the source; and means for controlling the counting of the counter means so that the controlling means starts the counter means upon detecting the rising leading edge of the signal pulse and stops the counter means when the counter means has counted for a time duration substantially equal to the duration of the signal pulse form the source received by the apparatus, wherein the count of the counter means when counting stops is substantially the same as the digital word at the source.

2. The apparatus of claim 1, wherein the detecting means is a zero crossing detector.

3. The apparatus of claim 1, wherein said information has been encoded according to a look up table containing a set of numbers each corresponding to a time duration which represents the information for transmission to the apparatus, and wherein said determining means stores therein said table for determining the information from the time duration.

4. The apparatus of claim 1, wherein the information is received through the medium from a transmitter which transmits the information a second time in the form of a second signal, and wherein the detecting means detects the two instances when the second signal crosses the predetermined threshold level, the time duration between the two instances when the second signal amplitude crosses the threshold level defining the second time duration, said apparatus further comprising:

means for storing an indication of the time duration; and means for comparing the two time durations and for generating a re-send signal for transmission to the transmitter requesting the transmitter to resend the information when the difference between the two time durations compared exceeds a predetermined amount.

5. A modem for modulating information from an information store for transmission through a medium which has a bandwidth substantially the same as the voiceband and for demodulating signals received from the medium to recover information contained therein destined for the information store, said modem comprising:

(a) a transmitting portion comprising:

means for generating a signal pulse whose duration is a function of the information from the information store to be transmitted;

filter means for filtering the signal pulse so that the duration of the filtered signal is substantially the same as that the signal pulse;

means for transmitting the filtered signal through the medium; and (b) a receiving portion comprising:

means for detecting two consecutive instances when the amplitude of the signal receiver crosses a predetermined threshold level;

means for determining the information from the time duration between the two instances an for transmitting the information to the information store.

6. The modem of claim 5 wherein the coding signal pulse is substantially square in shape.

7. The modem of claim 6, wherein said generating means includes:

counter means; n to be means for converting the information to be transmitted into a number according to a coding scheme, and for loading the counter means with the number representing the information to be transmitted, wherein the counter means is such that when it counts to said number, it will generate a count complete signal to so indicate; and means responsive to the count complete signal for generating the substantially square coding signal by switching between a high and a low voltage level.

8. The modem of claim 7, wherein the information received by the modem originates from a transmitting modem and is in the form of a digital word, wherein the information is transmitted from the transmitting modem to the receiving modem in the form of a signal pulse whose duration is proportional to the digital word, and wherein the determining means converts the duration of the signal pulse received back into the digital word.

9. The modem of claim 8, wherein said transmitting modem includes a clock operated at a predetermined rate and wherein the signal pulse transmitted by the transmitting modem is generated with a duration proportional to the product of the digital word multiplied by the rate of the clock, said determining means includes:

counter means operated at substantially the same rate as the clock of the transmitting modem;

means for controlling the counting of the counter means so that the controlling means starts the counter means upon detecting the rising leading edge of the signal pulse and stops the counter means when the counter means has counted for a time duration substantially equal to the duration of the signal pulse from the source received by the modem, wherein the count of the counter means when counting stops is substantially the same as the digital word at the source.

10. The modem of claim 8, wherein the detecting means is a zero crossing detector.

11. The modem of claim 5, said transmitting portion further comprising means for storing the information to be transmitted, wherein the transmitting portion transmits the information a second time in the form of a second filtered signal through the medium, thereby permitting comparison of the two filtered signals when received to check accuracy of transmission.

12. The modem of claim 5, said transmitting portion further comprising means for storing the information to be transmitted, wherein the information is transmitted through a medium to a receiver which checks the accuracy of transmission and sends an error indication signal to indicate that the received signal is inaccurate, and wherein the modem responds to the error indication signal by re-sending the information.

13. The modem of claim 5, wherein the information is received by the receiving portion through the medium from a transmitter which transmits the information a second time in the form of a second signal, and wherein the detecting means detects the time duration between two consecutive instances when the amplitude of the second signal crosses the predetermined threshold level, said time duration between the instances when the second signal amplitude crosses the threshold level defining the second time duration, said receiving portion further comprising:

means for storing the first time duration; and means for comparing the two time durations and for generating a re-send signal for transmission to the transmitter requesting the transmitter to resend the information when the difference between the two time durations compared exceeds a predetermined amount.

14. A method for receiving information by means of a receiver from a transmitter through a medium which has a bandwidth substantially the same as the voiceband, said information having been encoded in the form of a signal whose duration is a function of the information, wherein the transmitter transmits the information a second time in the form of a second signal, said method comprising:

detecting two consecutive instances when the amplitude of the signal received crosses a predetermined threshold level;

determining the information from the time duration between the two instances;
storing the time duration;
detecting two consecutive instances when the amplitude of the second signal received crosses a predetermined threshold level;
determining the information from the second time duration between the two instances when the amplitude of the second signal crosses the threshold level; and
comparing the first and second time durations and generating a re-send signal for transmission to the transmitter requesting the transmitter to re-send the information when the two time durations compared are different.

* * * * *

UNITED STATES PATENT AND TRADEMARK OFFICE
CERTIFICATE OF CORRECTION

PATENT NO. : 4,866,737

DATED : SEPTEMBER 12, 1989

INVENTOR(S) : BRUCE SEIFRIED

It is certified that error appears in the above-identified patent and that said Letters Patent is hereby corrected as shown below:

Column 10, line 61, in Claim 1: replace "form" with --from--

Column 11, line 42, in Claim 5: replace "receiver" with --received--

Column 11, line 45, in Claim 5: replace "an" with --and--

Column 11, line 52, in Claim 7: delete the phrase "n to be" after the word means Signed and Sealed this Tenth Day of March, 1992

Attest:

HARRY F. MANBECK, JR.

*Attesting Officer*　　　　　*Commissioner of Patents and Trademarks*